United States Patent [19]

Hertzog et al.

[11] 3,748,927

[45] July 31, 1973

[54] MULTI-ENGINE TO SINGLE SHAFT TORQUE TRANSMISSION

[75] Inventors: Heber T. Hertzog, Palos Verdes Peninsula, Calif.; Peter Kamstra, Phoenix, Ariz.

[73] Assignee: The Garrett Corporation, Los Angeles, Calif.

[22] Filed: Oct. 15, 1971

[21] Appl. No.: 189,575

[52] U.S. Cl. .................................................. 74/675
[51] Int. Cl. ........................................... F16h 37/08
[58] Field of Search ................... 74/675, 661, 665 B

[56] References Cited
UNITED STATES PATENTS

| | | | |
|---|---|---|---|
| 2,241,764 | 5/1941 | Bollinger et al. | 74/661 X |
| 2,366,646 | 1/1945 | Orr | 74/675 |
| 2,380,889 | 7/1945 | Waseige | 74/661 X |
| 2,779,213 | 1/1957 | Fell et al. | 74/675 |
| 3,194,087 | 7/1965 | Kronogard | 74/661 |
| 3,340,748 | 9/1967 | Young | 74/661 |
| 3,455,182 | 7/1969 | Kelley | 74/661 |
| 3,457,806 | 7/1969 | Weiland | 74/675 |
| 3,518,827 | 7/1970 | Riemerschmid | 74/675 X |

Primary Examiner—Charles J. Myhre
Assistant Examiner—Thomas C. Perry
Attorney—Albert J. Miller and Jack D. Puffer

[57] ABSTRACT

The apparatus is designed to transmit torque from two engines to a single output shaft such as a helicopter rotor shaft and to divide the power developed by the engines so that each transmits torque in certain ratios over two paths to the output shaft, simultaneously, when both engines are in operation and either engine will transmit subsantially all of the power developed thereby over one of the paths to the output shaft when the other engine is inoperative. The apparatus provides for use of single shaft engines without the danger of stalling out either engine in the event the other engine should fail. Each of the torque transmitting paths includes a drive pinion meshing with a main gear on the output shaft, a drive shaft connected with its respective drive pinion by a one-way clutch, a planetary gear system having a carrier connected with the drive shaft, planet gears on the carrier meshing with a ring gear restricted to rotation in one direction only, and a gear train with a series of gears extending between the ring gear of the planetary gear system and the engine shaft.

17 Claims, 6 Drawing Figures

Patented July 31, 1973
3,748,927
2 Sheets-Sheet 1
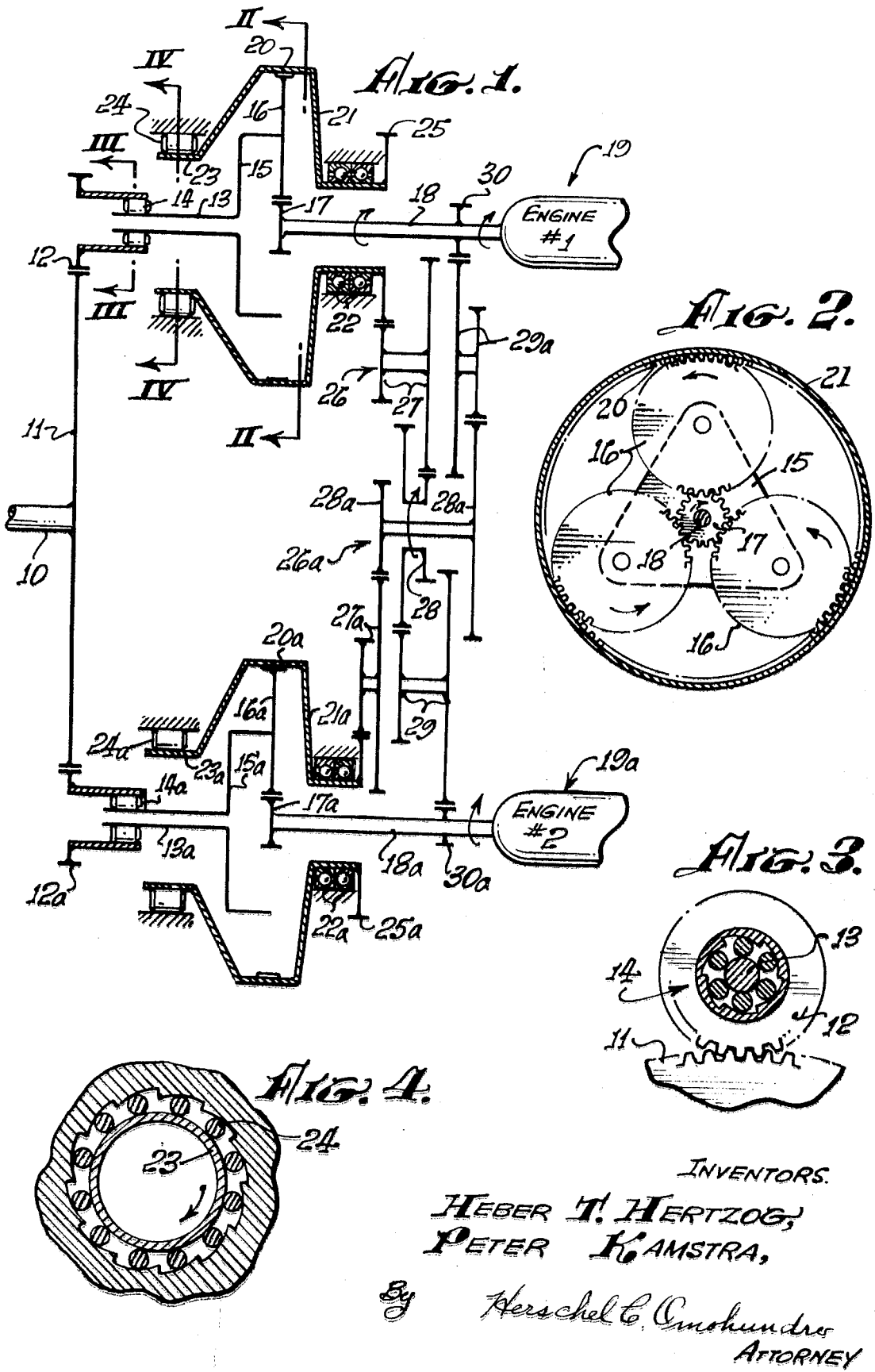
INVENTORS.
HEBER T. HERTZOG,
PETER KAMSTRA,
By Herschel C. Omohundro
ATTORNEY Patented July 31, 1973  3,748,927

INVENTORS.
HEBER T. HERTZOG,
PETER KAMSTRA,
By Herschel C. Omohundro
ATTORNEY.

MULTI-ENGINE TO SINGLE SHAFT TORQUE TRANSMISSION

SUMMARY OF THE INVENTION

This invention relates generally to transmission and is more particularly directed to means for transmitting torque from a plurality of engines to a single output shaft such as that employed to drive the rotor of a helicopter.

It is obvious that for reasons of safety and economy in helicopter operation it is desirable to use dual engines. Heretofore, split shaft or free turbine engines have been preferred since their torque/speed characteristic is such that as speed is decreased, available torque is increased. Thus, if one engine should fail during flight at a rotor torque setting requiring the power of two engines the rotor would simply slow down dragging the free turbine of the other engine down until the rotor torque required equalled the engine torque available and flight would continue at the reduced power level.

It is a known fact that single shaft turbine engines have certain advantages over free turbine engines such as reliability, because of the ease of control, fewer bearings and seals, longer life, and increased time between overhaul, as well as lower initial cost. In view of these advantages it is desired to utilize single shaft engines. One objection to such engines, however, is that the torque/speed characteristic is such that as speed is decreased available torque is also decreased and in the event one engine should fail during flight at a rotor torque setting requiring the power of two engines, the slow down of the rotor drags the other engine down until it stalls out with disastrous results.

An object of this invention is to provide a means for transmitting rotary power from a pair of single shaft engines to a single rotary shaft which will effect the continued operation of the rotary shaft by either engine in the event the other engine should fail. This objective is secured through the provision of a transmission means whereby when both engines are in operation the torque of each engine is divided and applied to the single shaft over a plurality of paths to drive the shaft under the power of both engines. If either engine fails a shift in gear ratio in one path is effected and substantially all of the torque from the operative engine is applied along such path to drive the shaft, perhaps at a lower speed but without stalling out the engine.

It is an object of this invention to provide a transmission having an output shaft for connection with the shaft to be driven, a gear on the shaft meshing with a pair of drive pinions each connected with its respective drive shaft by an overrunning clutch, and means forming a pair of power transmitting gear paths connecting each drive shaft with both engines, predetermined portions of the power developed by the engines being conducted over the paths to the drive shafts and through the pinions and gear to the output shaft.

A further object of the invention is to arrange a planetary gear system in one path of each pair of power transmitting gear paths mentioned in the preceeding paragraph and to restrict a part of each planetary gear system to rotation in one direction only to assist in effecting a shift in gear ratio in the path over which power is transmitted from the operating engine when either of the engines becomes inoperative.

A still further object of the invention is to arrange substantially duplicative gear paths connecting certain portions of the planetary gear systems mentioned in the preceding paragraph with the output shafts of the engines and select the gears so that certain ratios will be effective to transmit predetermined portions of power developed by the eingines to certain of the drive shafts.

Other objects and advantages of the invention will be made apparent by the following description of one form of the invention selected for illustration in the accompanying drawing.

BRIEF DESCRIPTION OF DRAWING

FIG. 1 is a schematic view of a transmission embodying the principles of the present invention;

FIGS. 2, 3 and 4 are detailed vertical transverse sectional views taken through parts of the transmission shown in FIG. 1 on planes indicated by the lines II—II, III—III, and IV—IV, respectively, of such FIG.

Figure 5:
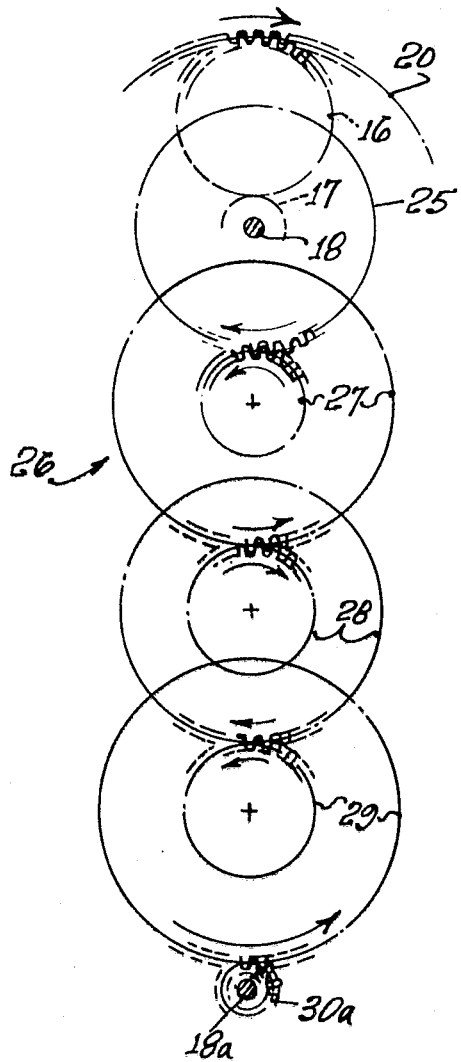
FIGS. 5 and 6 are schematic views of a pair of gear trains used in the transmission.

Referring more particularly to FIG. 1 of the drawing it will be seen that the transmission has a single output shaft 10 which is employed to deliver power to a desired component such as a helicopter rotor, not shown. Shaft 10 is provided with a large gear 11 meshing with two identical drive pinions 12 and 12a. Each pinion has a complemental planetary output shaft 13, 13a with a motion transmitting connection herewith via a one-way clutch 14, 14a. The reason for such clutch will be made apparent hereinafter. Shafts 13, 13a each have a planet gear carrier 15, 15a secured for rotation therewith, the carriers having planet gears 16, 16a supported for rotation thereon.

Planet gears 16, 16a mesh with sun gears 17, 17a secured to output shafts 18, 18a of engines 19, 19a which, in the preferred form of the invention, are single shaft gas turbine engines. The planet gears 16, 16a also mesh with internal ring gears 20, 20a formed in rotatably mounted casings 21, 21a suitably supported in bearings 22, 22a. These casings have hubs 23, 23a which, as shown in FIG. 4, cooperate with one-way brake means 24, 24a to limit the casings to a single direction of rotation. In the form of the invention selected for illustration the casings are limited to rotation in the same direction as the shafts 18, 18a of engines 19, 19a, i.e., clockwise. The reason for this restriction will also be made apparent in the following description.

Figure 6:
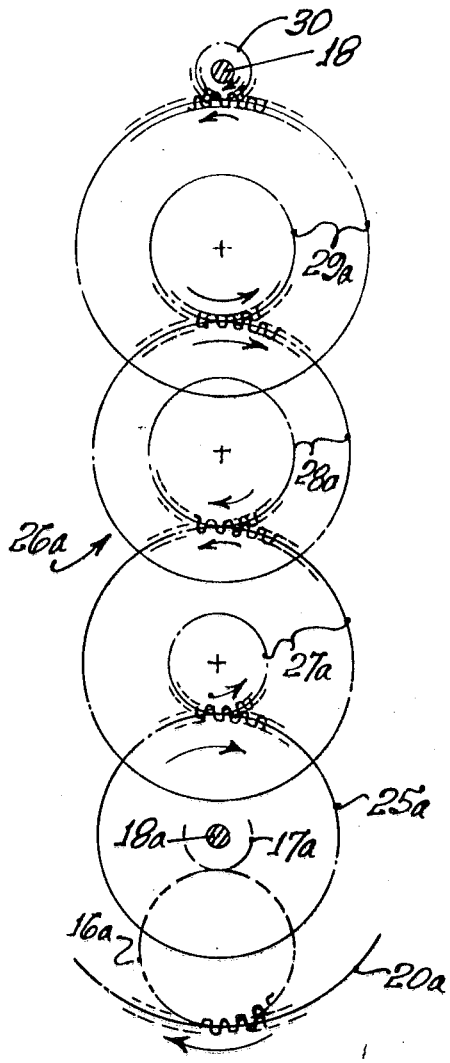

Casings 21, 21a and their respective ring gears 20, 20a are each provided with a gear 25, 25a forming part of a pair of gear trains 26, 26a, See FIGS. 5 and 6, through which torque is transmitted from each engine to the planetary output shaft 13, 13a of the other engine. In the form of transmission selected for illustration each gear train 26, 26a has a plurality of sets of compound idler gears 27, 27a; 28, 28a; and 29, 29a, for transmitting torque from a pinion 30, 30a on the engine shafts 18, 18a, respectively, to the gear 25, 25a. The gears of the trains 26, 26a are selected to provide the same torque transmission ratio between each engine and the planetary output shaft of the other engine. The ratio may be varied, the particular one selected being that most advantageous under the situation encountered.

In the normal operation of the apparatus both engines will be functioning to develop power and the major portion of torque from each engine will be transmitted through shafts 18, 18a and sun gears 17, 17a to planet gears 16, 16a. These gears will revolve or roll within the ring gears 20, 20a and impart rotary movement to the carriers 15, 15a and shafts 13, 13a. A minor portion of the torque of each engine will be transmitted via pinions 30, 30a and paths provided by gear trains 26, 26a to gears 25, 25a causing casings 21, 21a to revolve and impart rotary motion to ring gears 20, 20a. This motion will be in the same direction as planet carriers 15, 15a which are moved by the rotation of the planet gears in the ring gears, therefore additional power will be transmitted to the carriers 15, 15a and shafts 13, 13a in this manner. Since power is being transmitted by the shafts 13, 13a, the one-way or overrunning clutches 14, 14a will transfer it to pinions 12, 12a to drive the gear 11 and shaft 10.

It should again be noted that when both engines are operating the major portion of the torque developed by each will be transmitted directly to the planetary output shaft 13, 13a, of such engines via a first means composed of shaft 18, 18a; sun gear 17, 17a; planet gears 16, 16a and carrier 15, 15a due to the planet gears revolving in the ring gears 20, 20a. A predetermined minor part of the torque will be transmitted by each engine to the planetary output shaft 13, 13a of the other engine via a second means composed of pinions 30, 30a; gear trains 26, 26a; gears 25, 25a; casing 21, 21a; ring gears 20, 20a; planet gears 16, 16a; and carriers 15, 15a. The gears making up the trains 26, 26a are such that the torque transmitted thereby from the respective engine to the planetary output shafts 13, 13a of the other engine will be in the same direction and will supplement that transmitted directly by the latter engine.

In the event one of the engines should fail, power would cease to flow through gears 30 or 30a to the gear 25 or 25a by a gear train 26 or 26a from the failed engine and the torque applied by the operating engine to the ring gear 20 or 20a by a pinion 17 or 17a and the planet gear 16 or 16a would be in a direction so as to cause the ring gear 20 to reverse its direction of rotation.

Braking clutches 24 or 24a would restrain this rotation and cause this casing 21 or 21a and all gears and shafts connected thereto through the gear train 26 or 26a to also be held stationary. In this manner shaft 18 or 18a and sun gear 17 or 17a of the failed engine will be held stationary and power from the operating will be rotated. Since the ring gear 20 or 20a of the planetary system of such engine is now held against rotation in the normal direction by the gear train leading to the failed engine and in the other direction by the one-way brake 24 or 24a, planet gears 16 or 16a will roll around in the ring gear as before but substantially all of the torque developed by the operating engine 19 or 19a will be exerted to cause carrier 15 or 15a and drive shaft 13 or 13a to rotate. This power will be transmitted through the respective one-way clutch 14 or 14a and drive pinion 12 or 12a to gear 11 and shaft 10.

Although the pinion 12 or 12a on the same side of the transmission as the failed engine is in mesh with and will be rotated in the normal direction by gear 11, this rotation will be at a greater rate than that of its respective planetary output shaft 13 or 13a imparted by the operating engine through gear path 26 or 26a. Such difference in rates of rotation of the pinion and its shaft is made possible by the one-way clutch 14 or 14a. Since shaft 13 or 13a on the side of the failed engine is merely freewheeling and consuming negligible power substantially all of the torque developed by the operating engine will be transmitted to output shaft 10. Since the ring gear of the planetary on the same side of the transmission as the operating engine is held against rotation all motion transmitted to the planetary output shaft 13 or 13a will be as a result of the planet gears revolving in the ring gear at a reduced rate but at higher torque.

The design parameters selected will, of course, determine the division of torque between the two paths when both engines are operating and the speed of the output shaft 10 in the event of a failure of one engine.

We claim:

1. Means for transmitting rotary power from a pair of engines to a single output shaft comprising:
   a. a pair of elements for imparting power to said shaft,
   b. first means providing a first power transmitting path between each engine and its respective power imparting element, said first means transmitting a predetermined portion of the torque developed by each engine to its respective power imparting element;
   c. second means providing a second power transmitting path between each engine and the power imparting element of the other engine, said second means adding the remaining portion of the torque developed by each engine to the torque transmitted by the first means; and
   d. a third means for changing the portion of the power of one engine transmitted by the first power transmitting path to its respective power imparting element when the other engine becomes inoperative.

2. Means for transmitting rotary power from a pair of engines to a single rotary shaft comprising:
   a. a main gear fixed to said rotary shaft;
   b. dual driving pinions in meshing engagement with said main gear;
   c. a shaft for each of said pinions, each shaft directly corresponding with one of said engines;
   d. an overruning clutch between each pinion and its respective shaft to provide for the transmission of power from the shaft to the pinion and prevent the transmission of power from the pinion to the shaft; and
   e. means for normally transmitting torque from each engine to both of said pinions in a predetermined ratio when both engines are in operation and for transmitting torque at a different predetermined ratio when one of the engines is inoperative.

3. The power transmitting means of claim 2 in which the last-named means comprises a plurality of first gear trains connecting the output shaft of each engine with its corresponding pinion shaft and second gear trains connecting each engine to the pinion shafts corresponding to the other engine, said gear trains having unidirectional coupling means for restricting predetermined parts thereof to rotation in only one direction to provide for reaction of other parts therewith and a change in the power transmission ratio between either engine and its pinion shaft when the other engine becomes inoperative.

4. The power transmitting means of claim 3 in which said first gear trains are planetary gear systems.

5. The power transmitting means of claim 4 in which each of the planetary gear systems has a planet carrier connected to its respective pinion shaft.

6. The power transmitting means of claim 5 in which the sun gear of said planetary gear systems is directly driven by the output shaft of its respective engine.

7. The power transmitting means of claim 6 in which the ring gears of each of said planetary gear systems is operatively connected to said unidirectional coupling means.

8. The power transmitting means of claim 7 in which each ring gear unidirectional coupling means prevents the respective ring gear from rotating in a direction opposite that of the output shaft of its respective engine.

9. The power transmitting means of claim 4 in which the second gear trains comprise substantially duplicate power transmitting paths connecting the output shaft of each engine with the ring gear of the planetary gear system of the other engine.

10. The power transmitting means of claim 2 in which the last-named means transmits the torque developed by each engine to both pinion shafts in predetermined proportions when both engines are operating and transmits a larger proportion of torque developed by either engine to its corresponding pinion shaft when the other engine is inoperative.

11. The power transmitting means of claim 7 in which each of said second gear trains has a series of gears the first of which is connected with the output shaft of its respective engine and the last of which is connected with the ring gear of the planetary system of the other engine.

12. The power transmitting means of claim 11 in which the gears in said second gear trains are calculated to provide a predetermined division of torque produced by each engine between the pinion shaft of both engines.

13. A power transmission system comprising:
an output shaft;
an output gear attached to said output shaft;
first and second output pinions in mesh with said output gear;
first and second engines;
first and second engine output shafts connected to their respective engines, each of said engine output shafts having first and second engine pinions thereon;
a pair of first gear trains in mesh with the first engine pinions of their respective output shafts and connected respectively to said first and second output pinions;
a pair of second gear trains each in mesh with the second engine pinion of one of said engines and with the first gear train of the other engine;
unidirectional rotational mounting means for one of the members of each of said first gear trains; and
an unidirectional rotational mounting means connecting said output pinions to said first gear trains.

14. The power transmitting system as defined in claim 13 wherein the pair of first gear trains are planetary gear trains and the pair of secondary gear trains are spur gear trains.

15. The power transmitting system of claim 14 wherein the first engine pinion comprises the sun gear of said planetary gear train and said output pinions are connected to the carrier of said planetary gear system.

16. The power transmitting system of claim 15 wherein the second engine pinion is connected to the ring gear of the planetary system of the other engine and the second pinion engine pinion of the other engine is connected through the other second gear train to the ring gear of the planetary system of said first engine.

17. The power transmitting system of claim 16 wherein the unidirectional rotational member is connected to the ring gears of said planetary gear systems.

* * * * *